(12) United States Patent
Suzuki et al.

(10) Patent No.: US 6,809,448 B2
(45) Date of Patent: Oct. 26, 2004

(54) EXCIMER LASER APPARATUS

(75) Inventors: Natsushi Suzuki, Tochigi (JP); Hisashi Nara, Tochigi (JP); Shunsuke Yoshioka, Tochigi (JP); Toshimitsu Barada, Tokyo (JP); Atsushi Ooyama, Tokyo (JP); Toshiharu Nakazawa, Tokyo (JP); Shinichi Sekiguchi, Tokyo (JP); Hiroyuki Shinozaki, Tokyo (JP)

(73) Assignees: Ebara Corporation, Tokyo (JP); Komatsu Ltd., Tokyo (JP)

( * ) Notice: Subject to any disclaimer, the term of this patent is extended or adjusted under 35 U.S.C. 154(b) by 0 days.

(21) Appl. No.: 10/258,542

(22) PCT Filed: Apr. 26, 2001

(86) PCT No.: PCT/JP01/03652
§ 371 (c)(1),
(2), (4) Date: Oct. 25, 2002

(87) PCT Pub. No.: WO01/82423
PCT Pub. Date: Nov. 1, 2001

(65) Prior Publication Data
US 2003/0107283 A1 Jun. 12, 2003

(30) Foreign Application Priority Data
Apr. 26, 2000 (JP) .................................. 2000-126117
May 25, 2000 (JP) .................................. 2000-154609

(51) Int. Cl.$^7$ .......................... H02K 5/02; H02K 5/12; H02K 3/34
(52) U.S. Cl. ........................ 310/90.5; 310/45; 310/85
(58) Field of Search ....................... 310/43, 45, 85–86, 310/88, 196, 216, 217, 218, 254, 215

(56) References Cited
U.S. PATENT DOCUMENTS
4,500,142 A   2/1985   Brunet 4,562,164 A * 12/1985 Miyazaki et al. ........... 501/151

(List continued on next page.)

FOREIGN PATENT DOCUMENTS

EP       875685      11/1998
JP     59-217013    12/1984

(List continued on next page.)

OTHER PUBLICATIONS

Microfilm of the specification and drawings annexed to the request of Japanese Utility Model Application No. 45334/1990 (Laid–open No. 4526/1992), (NTN Corporation), Jan. 16, 1992, p. 4, line 7 to p. 5, line7; p. 7, line 13 to p. 9, line 3; Figs. 1A, 1B.

*Primary Examiner*—Tran Nguyen
(74) *Attorney, Agent, or Firm*—Wenderoth, Lind & Ponack, L.L.P.

(57) ABSTRACT

An excimer laser apparatus in which deterioration of the laser gas in the laser container can be suppressed, and damage to the magnetic bearings caused by the laser gas can be suppressed, and which can be reduced in size and operated efficiently, and has low power consumption. Each electromagnet (stator) (7-1) of a magnetic bearing (7) for supporting a rotary shaft (4) of a circulation fan 3 includes excitation coils. Each of the coils is arranged as one unit by embedding a coil body in a ceramic or glass type hardened material which is non-magnetic and has corrosion resistance against a laser gas. The excitation coils are attached to magnetic poles. Alternatively, coil wires (108b) of a radial magnetic bearing (108) can be isolated from a corrosive atmosphere by means of a separation wall (124) while projecting portions of cores (108b) extend through the separation wall (124) and are exposed toward a magnetic bearing rotor (108f).

11 Claims, 12 Drawing Sheets

U.S. PATENT DOCUMENTS

| | | | | | |
|---|---|---|---|---|---|
| 4,665,329 | A | * | 5/1987 | Raschbichler | 310/13 |
| 5,051,637 | A | * | 9/1991 | Harris et al. | 310/90.5 |
| 5,095,237 | A | * | 3/1992 | Bardas et al. | 310/90.5 |
| 5,300,841 | A | * | 4/1994 | Preston et al. | 310/90.5 |
| 5,300,843 | A | * | 4/1994 | Lyons et al. | 310/90.5 |
| 5,319,276 | A | * | 6/1994 | Schuler | 310/196 |
| 5,990,588 | A | * | 11/1999 | Kliman et al. | 310/86 |
| 5,994,814 | A | * | 11/1999 | Kawabata et al. | 310/216 |
| 6,075,304 | A | * | 6/2000 | Nakatsuka | 310/216 |
| 6,130,495 | A | * | 10/2000 | Schulten et al. | 310/196 |
| 6,188,159 | B1 | * | 2/2001 | Fan | 310/254 |
| 6,407,472 | B1 | * | 6/2002 | Takayanagi | 310/45 |
| 6,437,464 | B1 | * | 8/2002 | Neal | 310/43 |

FOREIGN PATENT DOCUMENTS

| | | | | | |
|---|---|---|---|---|---|
| JP | 61-165014 | | 7/1986 | | |
| JP | 63-66150 | | 12/1988 | | |
| JP | 4-60214 | | 2/1992 | | |
| JP | 4-156247 | * | 5/1992 | | 310/43 |
| JP | 5-196041 | | 8/1993 | | |
| JP | 8-200366 | | 8/1996 | | |
| JP | 11-087810 | | 3/1999 | | |
| JP | 2003-32692 | * | 1/2000 | | 310/45 |
| JP | 2001-182746 | | 7/2001 | | |
| WO | 99/42731 | | 8/1999 | | |

* cited by examiner (a)  (b)

(a)  (b)

Fig.4
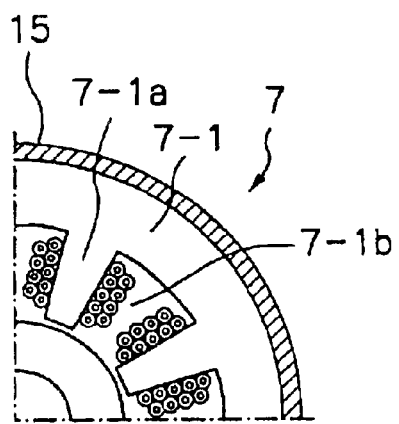
(a)
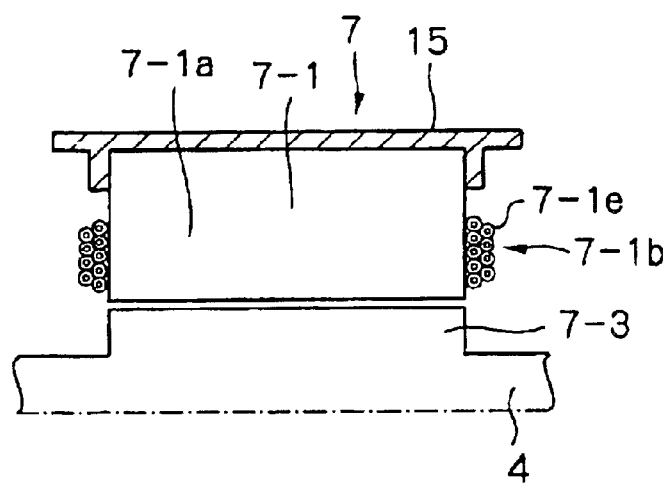
(b)

Fig. 14 (PRIOR ART)
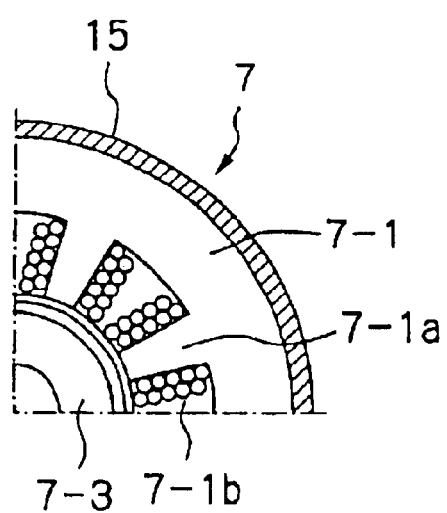
(a)
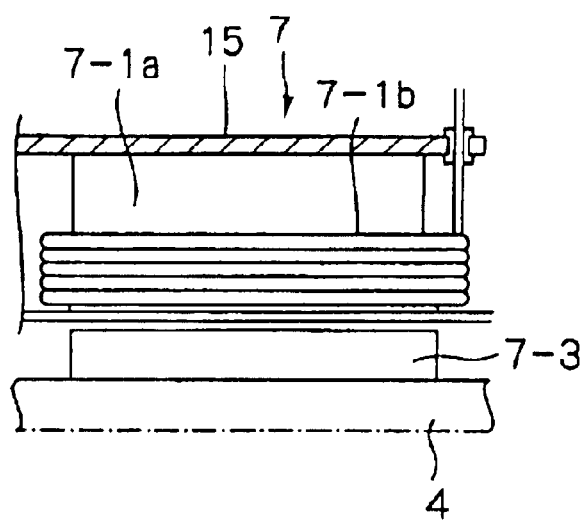
(b)

EXCIMER LASER APPARATUS

TECHNICAL FIELD OF THE INVENTION

The present invention relates to an excimer laser apparatus in which a rotary bearing of a laser gas circulating fan is supported by magnetic bearings.

BACKGROUND OF THE INVENTION

FIG. 12 is a first example of a basic arrangement of an excimer laser apparatus to which the present invention can be applied. FIG. 13 shows an arrangement of a motor housing of the apparatus of FIG. 12. In the excimer laser apparatus, a laser gas is sealably contained in a laser container 1. The laser gas contains a halogen type gas, such as a fluorine gas. A pair of main discharge electrodes 2, 2 are disposed in the laser container 1 so as to obtain an electric discharge for performing laser beam oscillation. Further, a circulation fan 3 is disposed in the laser container 1, so as to generate a flow of laser gas having a high velocity between the main discharge electrodes 2, 2.

The circulation fan 3 has a rotary shaft 4 extending therethrough, which is projected beyond opposite end portions of the fan 3. The rotary shaft 4 is rotatably supported by radial magnetic bearings 7, 7, 7 without making contact therewith, that is, in a floating condition. A motor 9 is provided so as to operate the circulation fan 3.

A magnetic bearing generally includes, as basic elements, a rotor, stators made of electromagnets for effecting floating support of the rotor and position sensors for detecting the position of the rotor. The radial magnetic bearing 7 shown in FIGS. 12 and 13 comprises a rotor 7-3 (FIG. 13) provided on the rotary shaft 4, stators, i.e., electromagnets 7-1, 7-1 arranged in a spaced relationship around the rotor, and displacement detection sensors 7-2, 7-2 provided around a sensor target 7-4 on the rotary shaft so as to detect displacement of the rotary shaft 4. Displacement signals from the displacement detection sensors 7-2, 7-2 are input to a control circuit (not shown) for phase compensation and gain adjustment. Output from this control circuit is supplied to the electromagnets 7-1, 7-1, which generate a magnetic attraction force or a magnetic repellent force in accordance with this output, to thereby support the rotary shaft 4 so that it is floated at a predetermined position between the electromagnets 7-1, 7-1.

As mentioned above, the laser gas is a corrosive gas containing, for example, a fluorine gas. Therefore, the electromagnets 7-1, 7-1 providing the radial magnetic bearing are subject to a corrosive environment. As shown in FIG. 14a and FIG. 14b, the electromagnet (stator) 7-1 comprises a stator core (iron core) 7-1a and excitation coils 7-1b attached to the stator core 7-1a. A separation wall 14 comprising a non-magnetic body is provided on an inner circumferential surface of the electromagnet 7-1, which surface surrounds the magnetic bearing rotor 7-3 provided on the rotary shaft 4. This prevents the electromagnet 7-1 (especially the excitation coils 7-1b which are liable to corrosion) from making contact with the laser gas. In FIGS. 12, 13, 14a and 14b, reference numeral 6 denotes a motor housing; 8 a window through which a laser beam is emitted; 10 a protective bearing; 11 a gas inlet chamber; 12 a dust removing filter; 13 a gas inlet tube; and 15 a magnetic bearing frame.

When the separation wall 14 is provided on the inner circumferential surface of the electromagnet 7-1, a problem arises, such that a magnetic gap between the electromagnet 7-1 and the magnetic bearing rotor 7-3 becomes large, thus reducing a magnetic attraction force or a magnetic repellent force obtained for effecting floating support of the rotary shaft 4. Therefore, in order to obtain a desired magnetic force of the magnetic bearing for controlling floating support of the rotary shaft, it is required to increase the size of the electromagnet 7-1. This is also problematic because the magnetic bearing inevitably becomes large.

In view of the above, the present invention provides an excimer laser apparatus in which an excitation coil of an electromagnet of a magnetic bearing has corrosion resistance against a laser gas, thus reducing the size of the magnetic bearing while increasing the life of the magnetic bearing, and preventing contamination of the laser gas.

FIG. 15 shows a second example of a basic arrangement of an excimer laser apparatus to which the present invention can be applied. As shown in FIG. 15, in this excimer laser apparatus, a laser gas containing a halogen type gas, such as a fluorine gas, is sealably contained in a laser container 201. In the laser container 201, there are provided pre-ionization electrodes (not shown) for pre-ionizing the laser gas and a pair of main discharge electrodes 202, 202 for obtaining an electric discharge for performing laser beam oscillation. Further, a circulation fan 203 is provided in the laser container 201, so as to generate a flow of the laser gas having a high velocity between the main discharge electrodes 202, 202.

The circulation fan 203 has a rotary shaft 204 extending therethrough, which is projected beyond opposite end portions of the circulation fan 203. Radial magnetic bearings 206, 207 and an axial magnetic bearing 208 are provided at opposite ends of the laser container 201. The rotary shaft 204 is rotatably supported by these magnetic bearings 206, 207, 208 without making contact therewith, that is, in a floating condition. A motor 209 for operating the circulation fan 203 is provided on a shaft end side of the radial magnetic bearing 207.

Displacement sensor targets 206c, 207c, 208d and magnetic bearing rotors 206d, 207d, 208e of the magnetic bearings are secured to the rotary shaft 204. Further, a rotor 209b of the motor 209 is secured to the rotary shaft 204. Displacement sensors 206a, 207a, 208a, electromagnets (i.e., magnetic bearing stators) 206b, 207b, 208b, 208c and a stator 209a of the motor 209 are provided so as to face the displacement sensor targets 206c, 207c, 208d, the magnetic bearing rotors 206d, 207d, 208e and the rotor 209b of the motor 209, respectively.

Separation walls 210, 211 in the forms of thin-walled cylinders are provided on inner circumferential surfaces of the displacement sensors 206a, 207a and the electromagnets 206b, 207b of the radial magnetic bearings 206, 207 and the stator 209a of the motor 209. The separation walls 210, 211 are made of a material having corrosion resistance against a halogen type gas contained in a laser gas, for example, austenite type stainless steel such as SUS316L. Thus, the displacement sensors 206a, 207a, the electromagnets 206b, 207b and the stator 209a of the motor 209, which comprise cores (iron cores) and coil wires having poor corrosion resistance against the laser gas, do not make contact with the laser gas.

In the axial magnetic bearing 208, a separation wall 212 is provided so as to prevent the displacement sensor 208a from making contact with the laser gas, as in the case of the radial magnetic bearings 206, 207. With respect to the magnetic bearing stators of the axial magnetic bearing 208, that is, the electromagnets 208b, 208c, the stator cores are made of a ferromagnetic material having corrosion resistance against a halogen type gas contained in a laser gas, such as a permalloy. Therefore, only the excitation coils are protected by separation walls 213.

The displacement sensor targets 206c, 207c, 208d and the magnetic bearing rotors 206d, 207d, 208e of the magnetic bearings, which are secured to the rotary shaft 104, are disposed within a sealed space communicated with the laser container 101. Therefore, the displacement sensor targets 206c, 207c, 208d and the magnetic bearing rotors 206d, 207d, 208e are made of a ferromagnetic material having corrosion resistance against a halogen type gas, such as a permalloy. The rotor 209b of the motor 209 is made of a composite of silicon steel plates and an aluminum alloy, or a permanent magnet. Therefore, a separation wall 214 in the form of a thin-walled cylinder is provided on a surface of the rotor 209b, so as to prevent the rotor 209b from making contact with the laser gas.

However, in the above-mentioned arrangement in which the separation walls 210, 211 in the forms of thin-walled cylinders are provided on the inner circumferential surfaces of the electromagnets 206b, 207b of the radial magnetic bearings 206, 207, the magnetic gap between the electromagnets 206b, 207b and the magnetic bearing rotors 206d, 207d of the radial magnetic bearings 206, 207 is increased by a distance corresponding to the wall thickness of the separation walls 210, 211. This leads to low efficiency and an increase in size of the magnetic bearings.

Generally, a magnetic force of the magnetic bearing decreases in proportion to the square of a gap between the magnet and a target. Therefore, in order to maintain a desired magnetic force while the gap is increased two times, it is required to use a magnetic bearing in which the surface area of the electromagnet or the number of windings of the coil of the electromagnet is increased four times, or the magnitude of a control current applied to the coil is increased two times.

In view of the above, the present invention has been made. It is an object of the present invention to provide a long-life excimer laser apparatus in which deterioration of the laser gas in the laser container can be suppressed, and damage to the magnetic bearings caused by the laser gas can be suppressed.

It is another object of the present invention to provide an excimer laser apparatus in which the magnetic bearings can be reduced in size and operated efficiently, and which has a low power consumption.

DISCLOSURE OF THE INVENTION

The present invention provides an excimer laser apparatus comprising: a laser container in which a laser gas is sealably contained; a circulation fan which generates a flow of laser gas between main discharge electrodes; and magnetic bearings which support a rotary shaft of the circulation fan, wherein: each magnetic bearing comprises a magnetic bearing rotor provided on the rotary shaft and magnetic bearing stators provided around the magnetic bearing rotor; and each magnetic bearing stator comprises a stator core at least part of which is exposed toward the magnetic bearing rotor, coils being attached to the stator core, and an isolating member for isolating each coil from the laser gas. By this arrangement, the coils of the magnetic bearing are isolated from a corrosive atmosphere of the laser gas, so that corrosion of the coils can be prevented and the life of the magnetic bearing can be increased. Further, contamination of the laser gas which is caused by corrosion of the coils can be prevented. Therefore, product quality and reliability of the excimer laser can be improved. Because only the coil is protected by the isolating member and at least part of the stator core is exposed toward the magnetic bearing rotor, the magnetic gap between the stator core and the magnetic bearing rotor can be reduced. Therefore, the magnetic bearing can be reduced in size and operated highly efficiently. As a result, it is possible to provide an excimer laser which requires a small installation area and has a low power consumption.

In one embodiment of the present invention, the isolating member is made of a corrosion-resistant material having corrosion resistance against the laser gas and each coil is embedded in the isolating member made of the corrosion-resistant material.

In another embodiment of the present invention, the corrosion-resistant material is a ceramic or glass type hardened material.

In a further embodiment of the present invention, the isolating member comprises a coil case for sealingly enclosing each coil.

In a further embodiment of the present invention, the isolating member comprises a sheath covering each electrically conductive wire of which the coil is made.

In a further embodiment of the present invention, the stator core comprises a magnetic body which has corrosion resistance against the laser gas or a magnetic body which has been subjected to an anticorrosion treatment against the laser gas. By this arrangement, contamination of the laser gas due to corrosion of the stator core exposed to a corrosive atmosphere can be prevented.

In a further embodiment of the present invention, each magnetic bearing is a radial magnetic bearing; the stator core has projecting portions facing the magnetic bearing rotor; the coils are attached to the projecting portions; and at least part of each projecting portion extends through a separation wall and is exposed toward the magnetic bearing rotor, the separation wall comprising the isolating member. By this arrangement, the projecting portions extending through the separation wall comprising the isolating member can be disposed in proximity to the magnetic bearing rotor, thus reducing the magnetic gap between the stator core and the magnetic bearing rotor.

In a further embodiment of the present invention, the magnetic bearing stators comprise a plurality of rodlike projecting portions and a base portion to which the projecting portions are connected, the base portion having a ring-shaped cross-section. By this arrangement, electromagnets can be easily manufactured by first attaching the coils to the rodlike projecting portions and then connecting the projecting portions to the ring-shaped base portion.

In a further embodiment of the present invention, each magnetic bearing is a radial magnetic bearing; and the stator core has projecting portions facing the magnetic bearing rotor, the coils being attached to the projecting portions, and an end face member attached to a surface of each projecting portion facing the magnetic bearing rotor, the end face member comprising a magnetic body having corrosion resistance against the laser gas, the end face member being exposed toward the magnetic bearing rotor. By this arrangement, the end face member providing part of the stator core can be disposed in proximity to the magnetic bearing rotor, thus reducing the magnetic gap between the stator core and the magnetic bearing rotor.

In a further embodiment of the present invention, a plurality of U-shaped cores, each having two projecting portions formed therein, are provided as the stator cores; the coils are attached to each U-shaped core so that the two projecting portions form an N-pole and an S-pole; the plurality of U-shaped cores are provided around the magnetic bearing rotor so that each projecting portion faces the magnetic bearing rotor and that two adjacent projecting portions of two adjacent U-shaped cores have the same polarity; the end face member is provided so as to extend between and onto the projecting portions having the same polarity; and the isolating member is provided so as to extend between the projecting portions having different polarities, the isolating member comprising a non-magnetic body. By this arrangement, the coils of the magnetic bearing can be isolated from a corrosive atmosphere of the laser gas, by means of the end face members and the isolating member. On the other hand, the end face member providing part of the stator core can be disposed in proximity to the magnetic bearing rotor, thus reducing the magnetic gap between the stator core and the magnetic bearing rotor. Because the isolating member extending between the N-polar projecting portion and the S-polar projecting portion comprises a non-magnetic body, no magnetic short circuit is caused. A magnetic flux passes through the magnetic bearing rotor and effectively exerts a magnetic force.

In a further embodiment of the present invention, the stator cores comprise a ring-shaped base portion provided around the magnetic bearing rotor and projecting portions extending radially inward from an inner circumferential surface of the base portion, the projecting portions being arranged at substantially equal intervals in a circumferential direction of the base portion; the coils are attached to the projecting portions so that an order of arrangement of the projecting portions is such that the N-pole, the S-pole, the S-pole and the N-pole are repeated as a unit; the end face member is provided so as to extend between and onto the projecting portions having the same polarity; and the isolating member is provided so as to extend between the projecting portions having different polarities, the isolating member comprising a non-magnetic body. By this arrangement, as compared to the end face members being attached only to the surfaces of the projecting portions facing the magnetic bearing rotor, the number of the end face members used in the magnetic bearing can be reduced by half. Therefore, the number of connecting portions between the end face members and the isolating member can be reduced, and the separation wall comprising the end face members and the isolating member can be easily manufactured.

BRIEF DESCRIPTION OF THE DRAWINGS

FIGS. 4a and 4b are cross-sectional views showing a further example of an arrangement of a magnetic bearing used in the excimer laser apparatus according to the first embodiment of the present invention.

FIGS. 14a and 14b are diagrams showing an arrangement of a magnetic bearing used in the excimer laser apparatus to which the present invention can be applied.

DETAILED DESCRIPTION OF THE INVENTION

Hereinbelow, embodiments of the present invention are described, with reference to the drawings.

Figure 1:
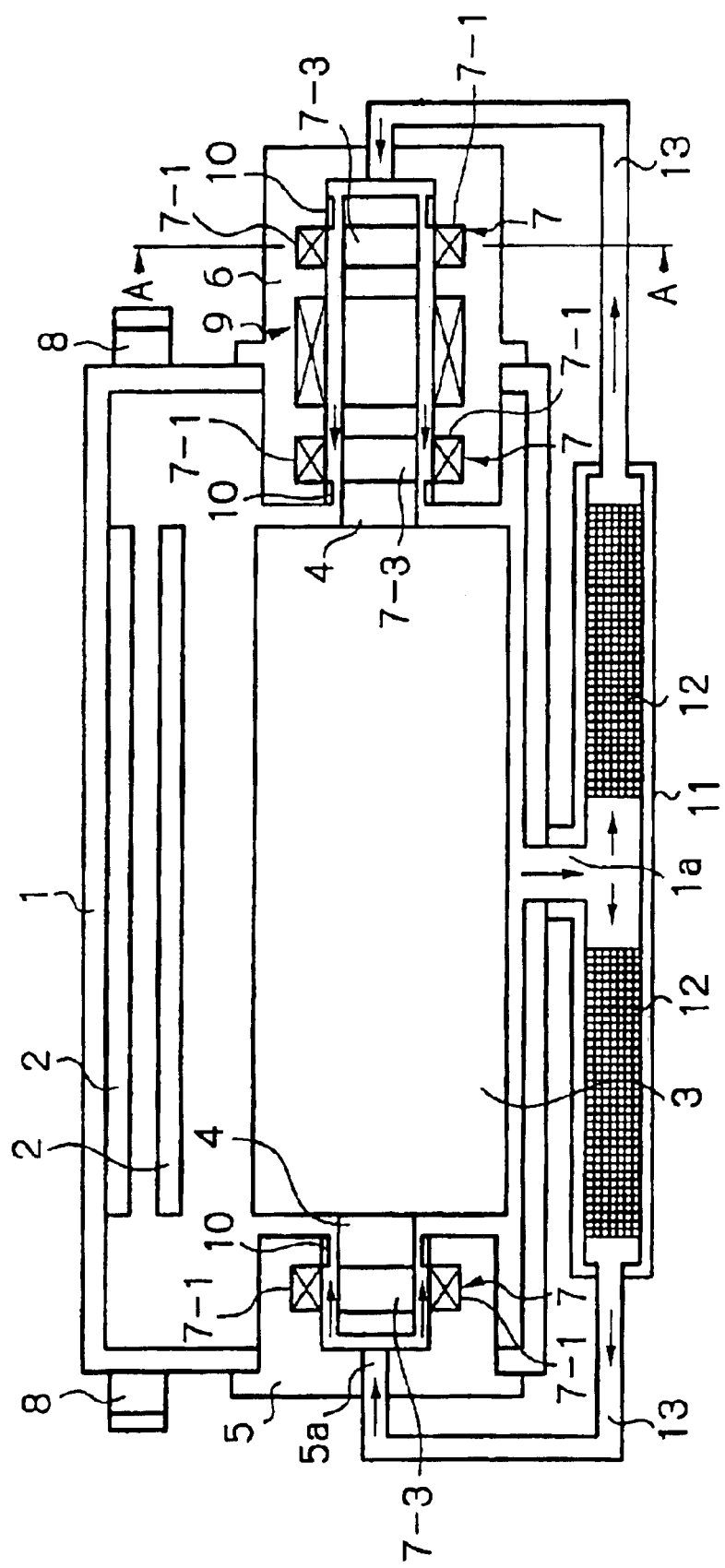
FIG. 1 is a cross-sectional view showing a basic arrangement of an excimer laser apparatus according to a first embodiment of the present invention.

FIG. 1 is a cross-sectional view showing a basic arrangement of an excimer laser apparatus according to a first embodiment of the present invention. In FIG. 1, the portions which are the same or correspond to the portions shown in FIGS. 12, 13, 14a and 14b are designated by the same reference numerals and characters as used in FIGS. 12, 13, 14a and 14b. As shown in FIGS. 2a, 2b, 3a, 3b, 4a and 4b, in the excimer laser apparatus in this embodiment of the present invention, no separation wall facing the magnetic bearing rotor 7-3 is provided on a surface of the electromagnet 7-1 of the radial magnetic bearing 7.

Figure 2:
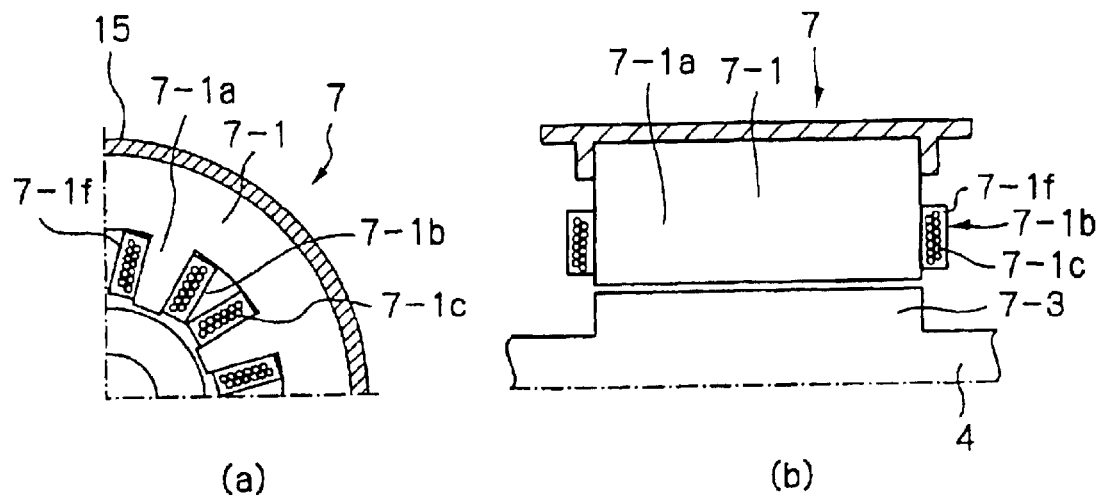
FIGS. 2a and 2b are cross-sectional views showing an example of an arrangement of a magnetic bearing used in the excimer laser apparatus according to the first embodiment of the present invention.

FIGS. 2a and 2b are cross-sectional views (one of which is taken along the line A—A in FIG. 1) showing an example of an arrangement of part of a radial magnetic bearing used in the excimer laser apparatus in the first embodiment. As shown in these drawings, the stator of the radial magnetic bearing 7, that is, the electromagnet 7-1, comprises the stator core 7-1a formed from a magnetic body and excitation coils 7-1b attached to the stator core 7-1a. Reference numeral 15 denotes the magnetic bearing frame. The excitation coil 7-1b is formed, as one unit, from a coil body 7-1c formed by coiling an electrically conductive wire and a ceramic or glass type hardened material 7-1f formed by molding around the coil body 7-1c. The hardened material 7-1f is non-magnetic and has corrosion resistance against a laser gas.

Thus, the excitation coil 7-1b is arranged as one unit by forming, by molding, the ceramic or glass type hardened material 7-1f which is non-magnetic and has corrosion resistance against a laser gas around the coil body 7-1c. Therefore, the excitation coil 7-1b itself has corrosion resistance against a laser gas. Therefore, it is unnecessary to provide a separation wall on the surface of the stator core 7-1a facing the magnetic bearing rotor 7-3, so as to prevent corrosion of the excitation coil 7-1b due to the laser gas. That is, the magnetic bearing has a simple structure.

In the excimer laser apparatus arranged as mentioned above, when the motor 9 is operated to thereby rotate the circulation fan 3, a laser gas sealably contained in the laser container 1, which contains a halogen type gas such as a fluorine gas, is caused to flow at a high velocity between the pair of main discharge electrodes 2, 2 and circulate through the laser container 1. That is, the laser gas is guided from a gas outlet opening 1a into the gas inlet chamber 1, in which dust is removed from the laser gas by means of the dust removing filters 12, 12. The laser gas after removal of the dust is further guided through the gas inlet tubes 13, 13 into the bearing housing 5 and the motor housing 6, and returns to the laser container 1.

A laser excitation discharge is caused by applying a high voltage between the main discharge electrodes 2, 2, thus performing laser beam oscillation. The laser beam thus generated is emitted to the outside of the laser container 1 through the windows 8, 8 provided in side walls of the laser container 1. Because the laser gas in the laser container 1 is circulated by means of the circulation fan 3, the laser gas between the main discharge electrodes 2, 2 is replaced with new laser gas for each electric discharge. This enables the laser beam oscillation to be stably repeated.

Figure 3:
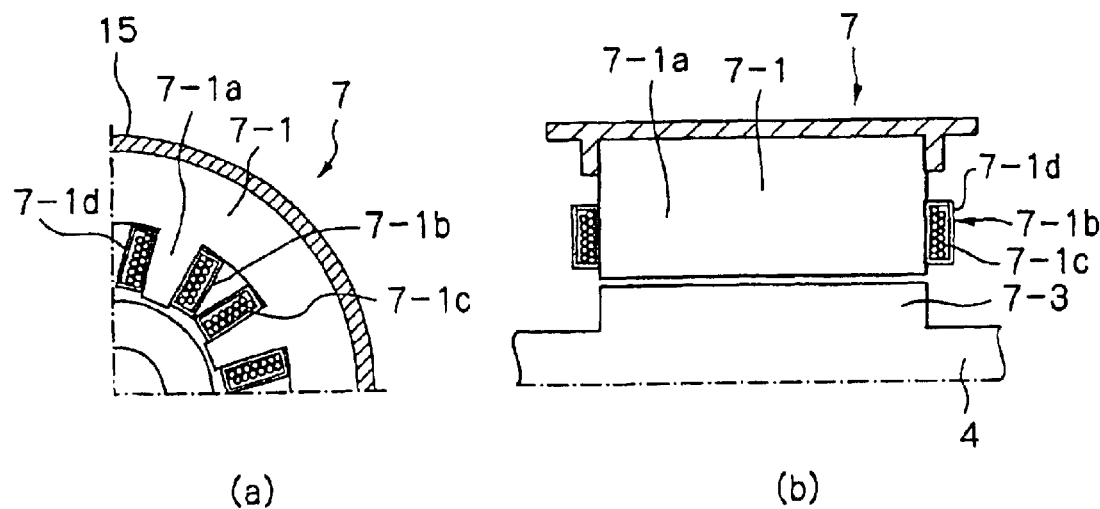
FIGS. 3a and 3b are cross-sectional views showing another example of an arrangement of a magnetic bearing used in the excimer laser apparatus according to the first embodiment of the present invention.

FIGS. 3a and 3b are cross-sectional views showing another example of an arrangement of part of a radial magnetic bearing used in the excimer laser apparatus in the first embodiment. As shown in the drawings, the excitation coil 7-1b comprises the coil body 7-1c formed by coiling an electrically conductive wire and a coil case 7-1d which sealingly encloses the coil body 7-1c. The coil case 7-1d is made of a material having corrosion resistance against a laser gas. The stator of the radial magnetic bearing 7, that is, the electromagnet 7-1, is obtained by attaching the excitation coils 7-1b to the stator core 7-1a.

Thus, the excitation coil 7-1b is arranged by sealingly enclosing the coil body 7-1c in the coil case 7-1d having corrosion resistance against a laser gas. Therefore, the excitation coil 7-1b itself has corrosion resistance against a laser gas. Therefore, differing from conventional techniques, it is unnecessary to provide a separation wall on the surface of the stator core 7-1a facing the magnetic bearing rotor 7-3, so as to prevent corrosion of the excitation coil 7-1b caused by the laser gas.

FIGS. 4a and 4b are cross-sectional views showing a further example of an arrangement of part of a radial magnetic bearing used in the excimer laser apparatus in the first embodiment. As shown in the drawings, the excitation coil 7-1b is formed by coiling a sheath wire 7-1e. The sheath wire 7-1e is obtained by covering an electrically conductive wire with an insolating material and further covering the insolating material on the wire with a sheath made of a material having corrosion resistance against a laser gas. The stator of the radial magnetic bearing 7 is arranged by attaching the excitation coils 7-1b to the stator core 7-1a.

Thus, the excitation coil 7-1b is arranged by coiling the sheath wire 7-1e having a sheath made of a material having corrosion resistance against a laser gas. Therefore, the excitation coil 7-1b itself has corrosion resistance against a laser gas. Therefore, differing from conventional techniques, it is unnecessary to provide a separation wall on the surface of the stator core 7-1a facing the magnetic bearing rotor 7-3, so as to prevent corrosion of the excitation coil 7-1b due to the laser gas.

As a material for the stator core 7-1a of the electromagnet 7-1 of the radial magnetic bearing 7, use is made of a magnetic body having corrosion resistance against a laser gas, for example, an austenite type magnetic body or a magnetic body a surface of which has been subjected to an anticorrosion treatment, such as nickel plating.

In FIG. 1, an axial magnetic bearing of the excimer laser apparatus is omitted. With respect to a stator (an electromagnet) of the axial magnetic bearing, the same effects as described above can be obtained by using an excitation coil in which a ceramic or glass type hardened material which is non-magnetic and has corrosion resistance against a laser gas is formed around the coil body by molding, or an excitation coil in which the coil body is sealingly enclosed in a coil case having corrosion resistance against a laser gas, or an excitation coil obtained by coiling a sheath wire comprising an electrically conductive wire sealingly covered with a corrosion-resistant sheath.

Figure 5:
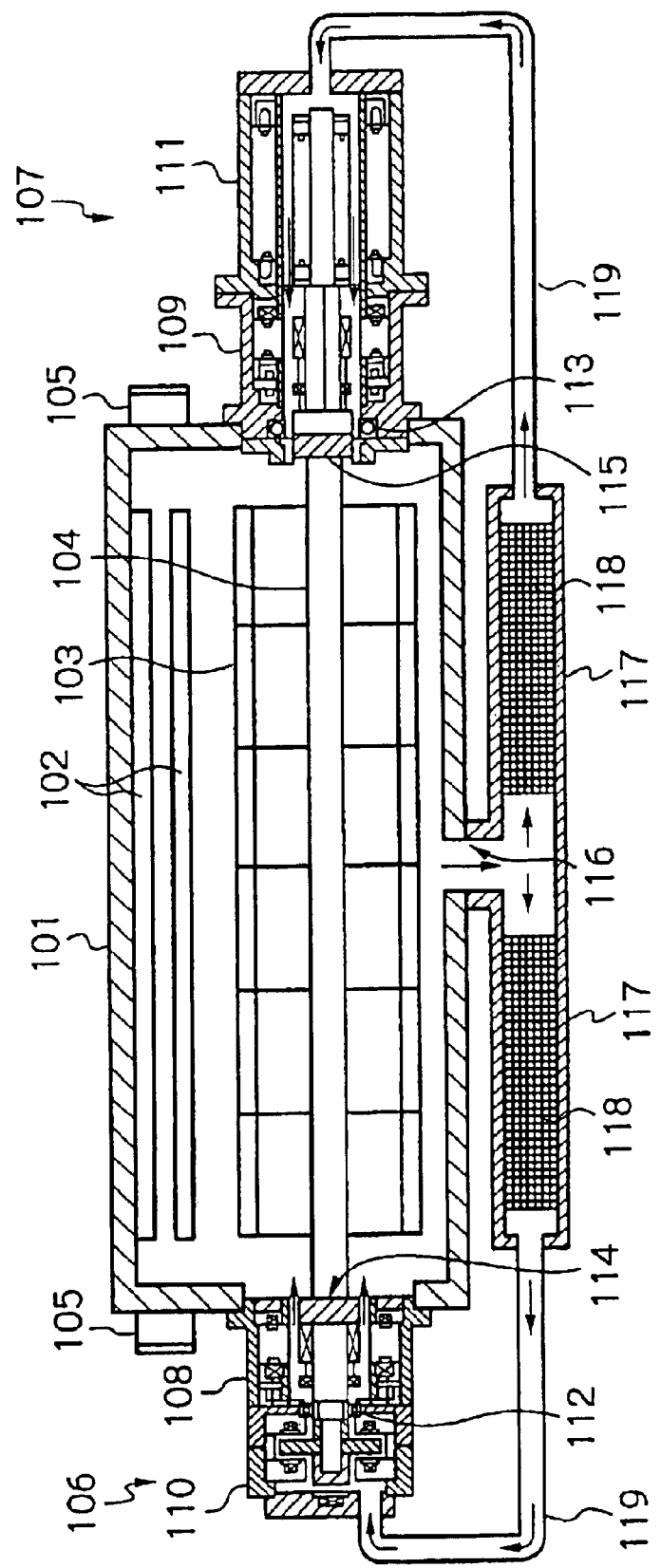
FIG. 5 is a cross-sectional view showing a basic arrangement of an excimer laser apparatus according to a second embodiment of the present invention.
Figure 6:
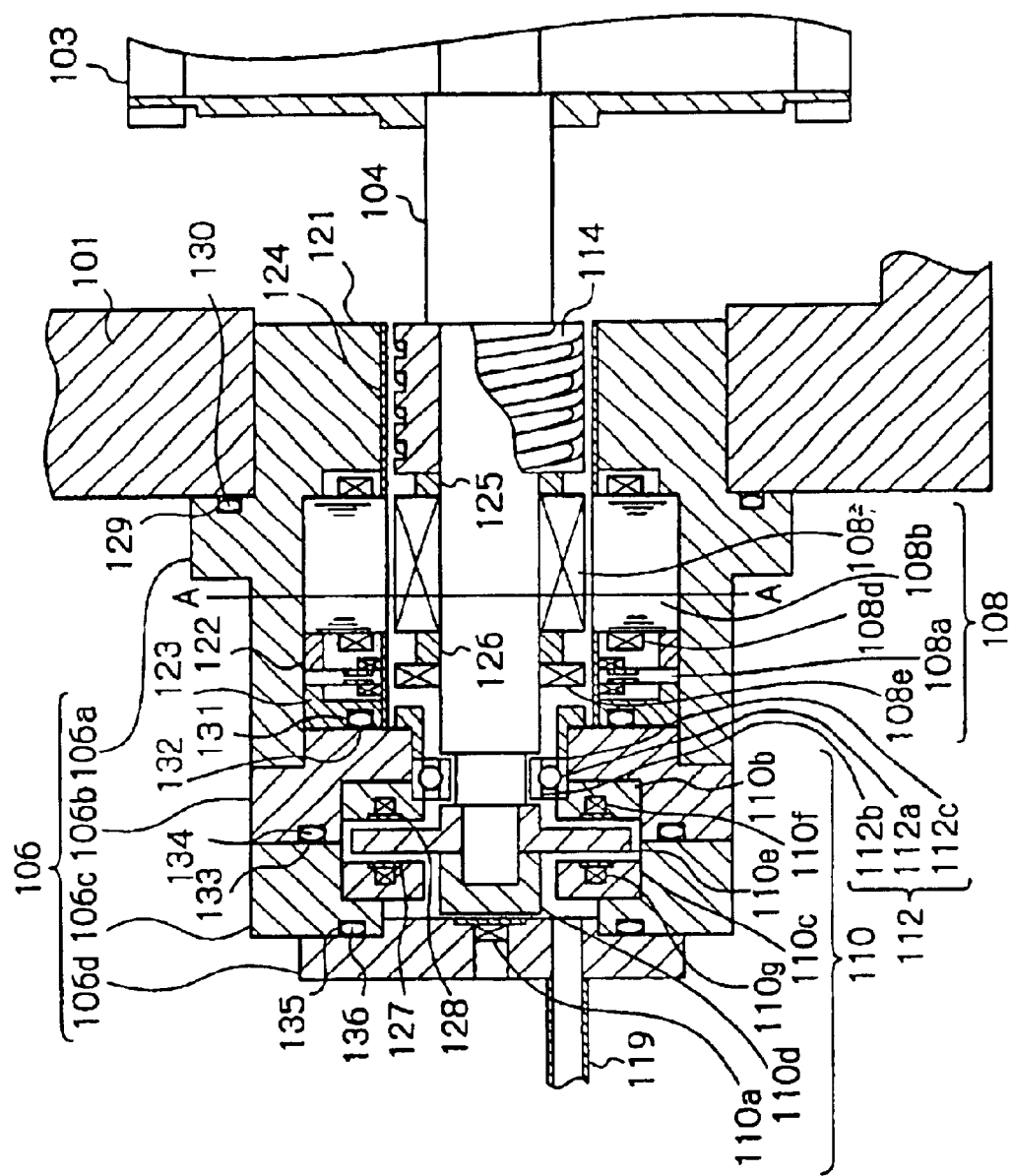
FIG. 6 is a cross-sectional view showing a detail of an arrangement of a bearing housing and its vicinities in the excimer laser apparatus according to the second embodiment of the present invention.
Figure 7:
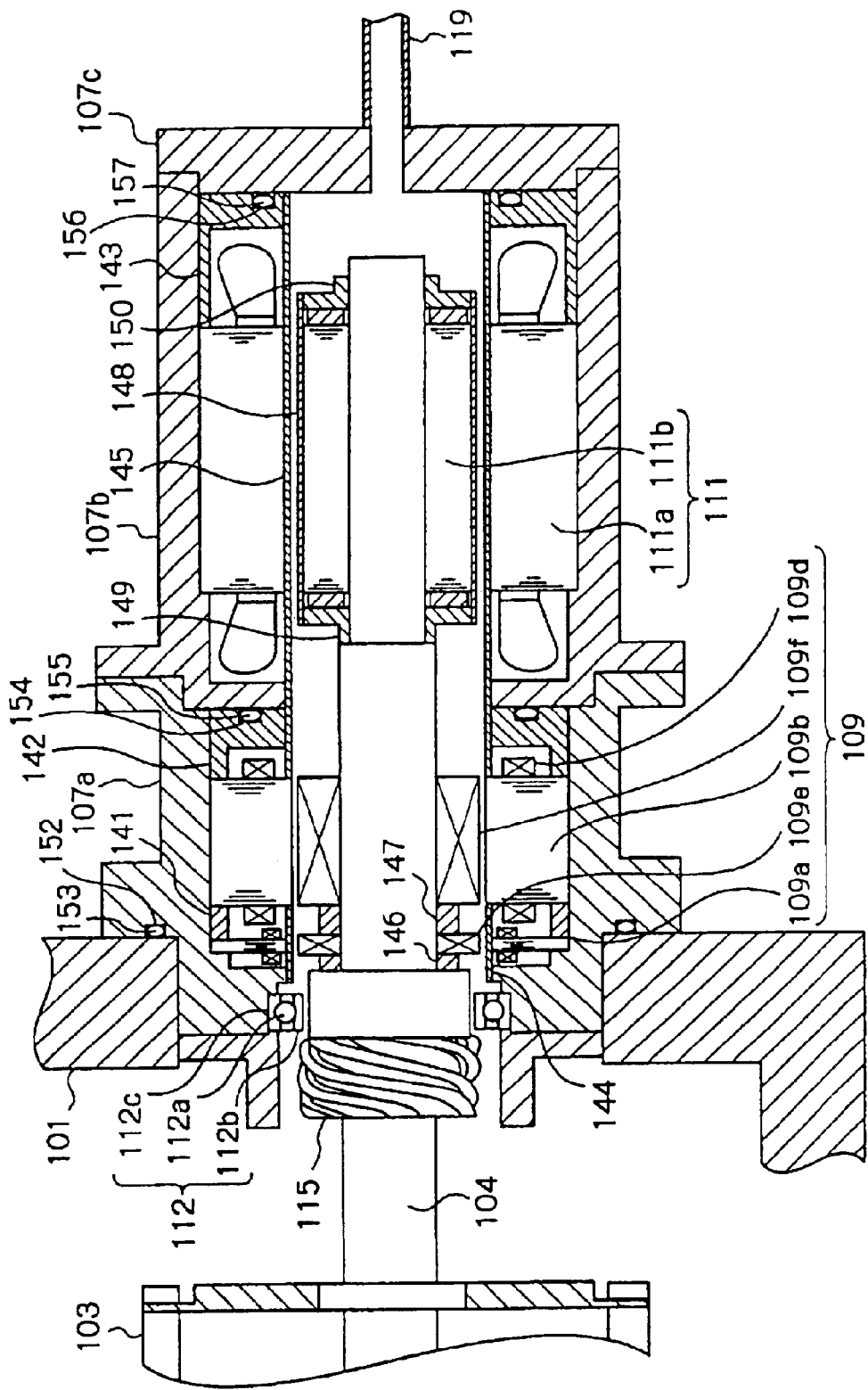
FIG. 7 is a cross-sectional view showing a detail of an arrangement of a motor housing and its vicinities in the excimer laser apparatus according to the second embodiment of the present invention.

FIGS. 5 to 12 show an arrangement of an excimer laser apparatus according to a second embodiment of the present invention. FIG. 5 is a cross-sectional view of the entire excimer laser apparatus. FIG. 6 is a cross-sectional view showing a detail of an arrangement of a bearing housing and its vicinities in the excimer laser apparatus. FIG. 7 is a cross-sectional view showing a detail of an arrangement of a motor housing and its vicinities in the excimer laser apparatus. FIGS. 8 to 12 show examples of arrangements of magnetic bearings, as viewed in cross-section taken along the line A—A in FIG. 6.

In the excimer laser apparatus in this embodiment, a laser gas containing a halogen type gas, such as a fluorine gas, is sealably contained in a laser container 101. In the laser container 101, there are provided pre-ionization electrodes (not shown) for pre-ionizing the laser gas and a pair of main discharge electrodes 2, 2 for obtaining an electric discharge for performing laser beam oscillation. A circulation fan 103 is provided in the laser container 101, so as to generate a flow of the laser gas having a high velocity between the main discharge electrodes 102, 102.

A laser excitation discharge is caused by applying a high voltage between the discharge electrodes 102, 102, thus performing laser beam oscillation. The laser beam thus generated is emitted to the outside of the laser container 101 through windows 105, 105 provided in side walls of the laser container 101. The laser excitation discharge causes deterioration of the laser gas between the discharge electrodes 102, 102. Consequently, characteristics of electric discharge are deteriorated, so that it becomes difficult to perform repeated oscillation. Therefore, by means of the circulation fan 103, the laser gas in the laser container 101 is circulated so that the laser gas between the discharge electrodes 102, 102 is replaced with new laser gas for each electric discharge, to thereby perform stably repeated oscillation.

The distance between the main discharge electrodes 102, 102 is 16 mm. The length of the main discharge electrodes 102, 102 is about 600 mm. The frequency of oscillation is several thousand times per second. The length of the circulation fan 103 is slightly greater than that of the main discharge electrodes 102, 102 so that the velocity of laser gas flow becomes uniform over the entire length of the electrodes. The circulation fan 103 is rotated at a speed of several thousand rpm, to thereby obtain a laser gas flow having the necessary and sufficient velocity for performing repeated oscillation between the main discharge electrodes 102, 102.

The circulation fan 103 has a rotary shaft 104 extending therethrough, which is projected beyond opposite end portions of the circulation fan 103. Radial magnetic bearings 108, 109 and an axial magnetic bearing 110 are accommodated in a bearing housing 106 and a motor housing 107 provided at opposite end portions of the laser container 101. The rotary shaft 104 is rotatably supported by the radial magnetic bearings 108, 109 and the axial magnetic bearing 110 without making contact therewith, that is, in a floating condition. A motor 111 applies a torque to the rotary shaft 104 of the circulation fan 103.

Thread groove labyrinths 114, 115 are provided on a side of the laser container 101 in the bearing housing 106 and the motor housing 107, so as to prevent entry of dust into the housings. Thus, it is possible to avoid a situation such that dust generated in the laser container 101 will enter (penetrate) the bearing housing 106 and the motor housing 107 and contaminate rolling surfaces of protective bearings 112, 113.

A gas outlet opening 116 is provided in the laser container 101. The laser gas from the gas outlet opening 116 enters gas inlet chambers 117, 117, in which dust is removed from the laser gas by means of dust removing filters 118, 118. The laser gas then passes through gas inlet tubes 119, 119 and is introduced into the bearing housing 106 and the motor housing 107 in the vicinity of the ends of the rotary shaft. That is, the laser gas is circulated as indicated by arrows in FIG. 5, to thereby surely prevent entry (penetration) of dust into the bearing housing 106 and the motor housing 107.

As shown in FIG. 6, the bearing housing 106 comprises a bearing housing body 106a, a right-hand electromagnet housing 106b, a left-hand electromagnet housing 106c and a bearing cover 106d. The bearing housing body 106a is connected to the side wall of the laser container 101. The right-hand electromagnet housing 106b is connected to the bearing housing body 106a, and the left-hand electromagnet housing 106c is connected to the right-hand electromagnet housing 106b, and the bearing cover 106d is connected to the left-hand electromagnet housing 106c. Seal recesses 129, 131, 133, 135 are provided at connecting surfaces of the bearing housing body 106a, the right-hand electromagnet housing 106b, the left-hand electromagnet housing 106c and the bearing cover 106d. Seal members 130, 132, 134, 136 are attached to these recesses so as to prevent leakage of the laser gas. It is advantageous to use, as the seal members 130, 132, 134 and 136, seal members made of a metal which does not produce moisture or other gases which contaminate the laser gas (such as stainless steel or aluminum).

Displacement sensors 108a and cores (iron cores) 108b of electromagnets (stators) of the radial magnetic bearing 108 are accommodated in the bearing housing body 106a, in which they are disposed in relative positions determined by spacers 121, 122 and a side plate 123. A projecting portion of the core 108b extends through a separation wall 124 formed from a plate type non-magnetic body. A distal end surface of the projecting portion is exposed.

The separation wall 124 is made of a material having corrosion resistance against the laser gas, such as austenite type stainless steel. Opposite ends of the separation wall 124 are secured by, for example, welding. By providing the separation wall 124, it is possible to prevent the laser gas from making contact with the displacement sensors 108a and electromagnet coils 108d which have poor corrosion resistance against the laser gas.

The core 108b of the electromagnet (stator) makes contact with the laser gas and is therefore required to have corrosion resistance. Therefore, a permalloy (an Fe—Ni alloy comprising 30 to 80% of Ni) having good corrosion resistance against the laser gas was used for the core 108b. Although a permalloy is used in this embodiment, a magnetic material other than permalloys, a surface of which (a surface making contact with the laser gas) has been subjected to an anticorrosion treatment such as nickel plating, may be used.

A right-hand electromagnet 10b and a left-hand electromagnet 110c of the axial magnetic bearing 110 are disposed so as to face each other and secured to the right-hand electromagnet housing 106b and the left-hand electromagnet housing 106c, respectively, by welding. Coil wires 110f, 110g are inserted into coil recesses formed in the cores (iron cores) of the right-hand electromagnet 110b and the left-hand electromagnet 110c, and separation walls 127, 127 in the forms of thin circular plates are secured by welding, so as to prevent the coil wires 110f, 110g from making contact with the laser gas.

An axial displacement sensor 110a is accommodated in the bearing cover 106d. A separation wall 128 in the form of a thin circular plate is secured, by welding, to the surface of the sensor which otherwise would make contact with the laser gas. Thus, the axial displacement sensor 110a is disposed outside a sealed space communicated with the laser container 101.

The right-hand electromagnet 110b and the left-hand electromagnet 110c make contact with the laser gas. Therefore, as a material for the cores (iron cores) of these electromagnets, use is made of a permalloy (an Fe—Ni alloy comprising 30 to 80% of Ni) having good corrosion resistance against a fluorine gas contained in the laser gas. As a material for the separation walls 127, 127, 128, use is made of austenite type stainless steel having corrosion resistance against the laser gas.

On the other hand, a displacement sensor target 108e and a magnetic bearing rotor 108f of the radial magnetic bearing 108 are secured to the rotary shaft 104 of the circulation fan 103, in a state such that they are disposed in relative positions determined by rotor spacers 125, 126. Further, a displacement sensor target 110d and a magnetic bearing rotor 110e of the axial magnetic bearing 110 are secured to the rotary shaft 104 and disposed within the sealed space communicated with the laser container 101.

As a magnetic material for the displacement sensor target 108e and the magnetic bearing rotor 108f of the radial magnetic bearing 108, and the displacement sensor target 110d and the magnetic bearing rotor 110e of the axial magnetic bearing 110, use is made of a permalloy (an Fe—Ni alloy comprising 30 to 80% of Ni) having good corrosion resistance against a fluorine gas contained in the laser gas.

In the displacement sensor target 108e and the magnetic bearing rotor 108f, an eddy current is generated due to a change in magnetic field caused by rotation. In order to suppress an eddy current loss, each of the displacement sensor target 108e and the magnetic bearing rotor 108f is generally formed from a stack of thin plates. In this arrangement, however, the laser gas flow stagnates in a space between the stacked plates, resulting in contamination of the laser gas. Further, when a PB permalloy is used for the displacement sensor target 108e and the magnetic bearing rotor 108f, there is a possibility that uniform, strongly-adhered Ni plating will not be able to be deposited on the surface of each plate. In order to avoid these problems, each of the displacement sensor target 108e and the magnetic bearing rotor 108f should be formed as an integral body made of a permalloy. With respect to the displacement sensor target 110d and the magnetic bearing rotor 110e of the axial magnetic bearing 110, there is no change in magnetic field due to rotation. Therefore, each of the displacement sensor target 110d and the magnetic bearing rotor 110e was formed as an integral body of a permalloy.

As the protective bearing 112, a rolling bearing was used. The protective bearing 112 comprises a rolling body 112a made of alumina ceramics, and an outer ring 112c and an inner ring 112b, each made of stainless steel such as SUS440C. The protective bearing 112 is disposed within the sealed space communicated with the laser container 1. Therefore, the rolling body 112a, the outer ring 112c and the inner ring 112b are made of a material having corrosion resistance against the laser gas. Therefore, the protective bearing 112 in this embodiment is not deteriorated due to contact with the laser gas.

The protective bearing 112 is advantageous because the rolling body 112a is made of alumina ceramics and therefore the allowable rotation speed of the protective bearing 112 and the allowable load on the protective bearing 112 becomes large. The protective bearing 112 is formed from the above-mentioned materials. However, the rolling body 112a may be made of zirconia ceramics. The outer ring 112c and the inner ring 112b may be made of alumina ceramics or zirconia ceramics.

As shown in FIG. 7, the motor housing 107 comprises a bearing housing body 107a, a motor housing body 107b and a bearing cover 107c. The bearing housing body 107a is connected to the side wall of the laser container 101. The motor housing body 107b is connected to the bearing housing body 107a and the bearing cover 107c is connected to the bearing housing body 107b. Seal recesses 152, 154, 156 are provided at connecting surfaces of the bearing housing body 107a, the motor housing body 107b and the bearing cover 107c. Seal members 153, 155, 157 are attached to these recesses so as to prevent leakage of the laser gas. It is advantageous to use, as the seal members 153, 155, 157, seal members made of a metal which does not produce moisture or other gases which contaminate the laser gas (such as stainless steel or aluminum).

Displacement sensors 109a and cores (iron cores) 109b of electromagnets (stators) of the radial magnetic bearing 109 are accommodated in the bearing housing body 107a, in which they are disposed in relative positions determined by a spacer 141 and a side plate 142. A projecting portion of the core 109b of the electromagnet (stator) of the radial magnetic bearing 109 is connected to a separation wall 145 comprising a plate type non-magnetic body. A detail of an arrangement of the radial magnetic bearing 109 is the same as that of the radial magnetic bearing 108 and therefore explanation thereof is omitted.

A motor stator 111a of the motor 101 and a side plate 143 are accommodated in the motor housing body 107b. The separation wall 145 in the form of a thin-walled cylinder is provided on an inner circumferential surface of the motor stator 111a, and opposite ends of the separation wall 145 are secured by welding, to thereby prevent the motor stator 111a from making contact with the laser gas. For the above-mentioned reasons, the separation wall 145 is made of austenite stainless steel.

On the other hand, a displacement sensor target 109e and a magnetic bearing rotor 109f of the radial magnetic bearing 109 and a motor rotor 111b of the motor 111 are secured to the rotary shaft 104 of the circulation fan 103, in a state such that they are disposed in relative positions determined by rotor spacers 146, 147, and are disposed within the sealed space communicated with the laser container 101. As a magnetic material for the displacement sensor target 109e and the magnetic bearing rotor 109f, as in the case of the displacement sensor target 108e and the magnetic bearing rotor 108f of the radial magnetic bearing 108, use is made of a permalloy (an Fe—Ni alloy comprising 30 to 80% of Ni).

The motor rotor 111b of the motor 111 is made of a composite of a stack of silicon steel plates and aluminum. Therefore, in Ni plating which is a suitable anticorrosion treatment, a uniform, strongly-adhered Ni layer cannot be formed on the surface of the motor rotor. Therefore, a separation wall 148 is attached to an outer circumferential surface of the motor rotor 111b and secured to side plates 149, 150 by welding. The side plates 149, 150 are secured to the rotary shaft 104 of the circulation fan 103 by welding, to thereby form a sealed space for preventing the motor rotor from making contact with the laser gas. For the above-mentioned reasons, the separation wall 148 is made of austenite type stainless steel.

As in the case of the protective bearing 113 provided in the bearing housing 106, the protective bearing 112 is a rolling bearing comprising the rolling body 112a made of alumina ceramics and the outer ring 112c and the inner ring 112b, each made of stainless steel such as SUS 440C.

Figure 8:
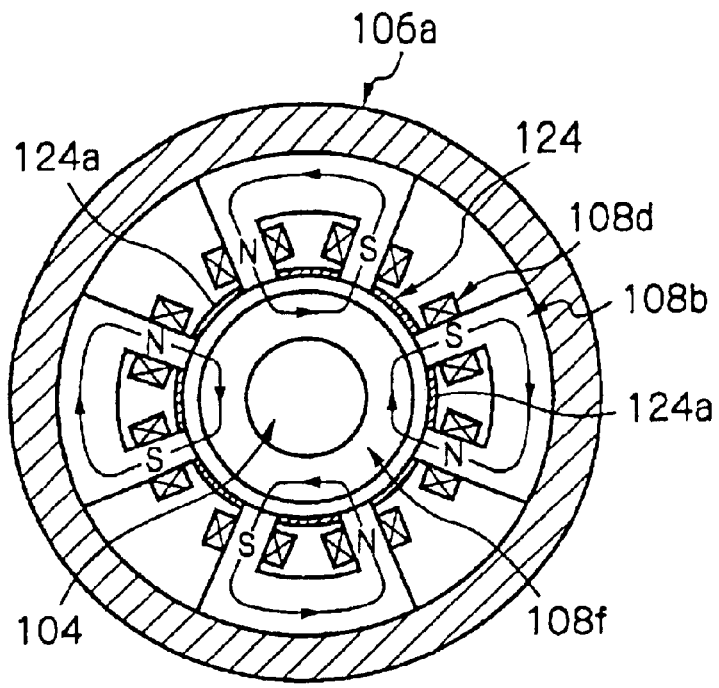
FIG. 8 is a diagram showing an example of an arrangement of a magnetic bearing, as viewed in cross-section taken along the line A—A in FIG. 6.

As shown in FIG. 8, the cores 108b of the electromagnets (stators) of the radial magnetic bearing 108 comprise U-shaped cores (iron cores), each having two projecting portions. A plurality of such cores 108b are arranged at substantially equal intervals in a circumferential direction around the rotor. Each projecting portion faces an outer circumferential surface of the magnetic bearing rotor 108f. The coil wires 108d are attached to the two projecting portions of each core 108b so that one projecting portion forms an N-pole and the other projecting portion forms an S-pole. Thus, as indicated by arrows in FIG. 8, magnetic paths are formed in the cores 108b and the magnetic bearing rotor 108f.

The projecting portions of the cores 108b are connected to a plate type non-magnetic body 124a and form the separation wall 124 which surrounds the magnetic bearing rotor 108f. Thus, the magnetic bearing rotor 108f and the rotary shaft 104 are disposed within the sealed space communicated with the laser container 101, while the coil wires 108d are disposed outside the sealed space.

Because the N-pole projecting portion and the S-pole projecting portion of the core 108b are connected through the non-magnetic body 124a, there is no possibility of a magnetic short circuit being caused. A magnetic flux generated by energizing the coil wires 108d reliably passes through the magnetic bearing rotor 108f, and effectively exerts a magnetic force on the magnetic bearing rotor 108f.

Further, because the core 108b becomes part of the separation wall 124 forming the sealed space communicated with the laser container 101, a magnetic gap in the magnetic path of the electromagnet of the radial magnetic bearing 108 can be made small. Therefore, a compact and highly efficient radial magnetic bearing can be easily obtained.

Figure 9:
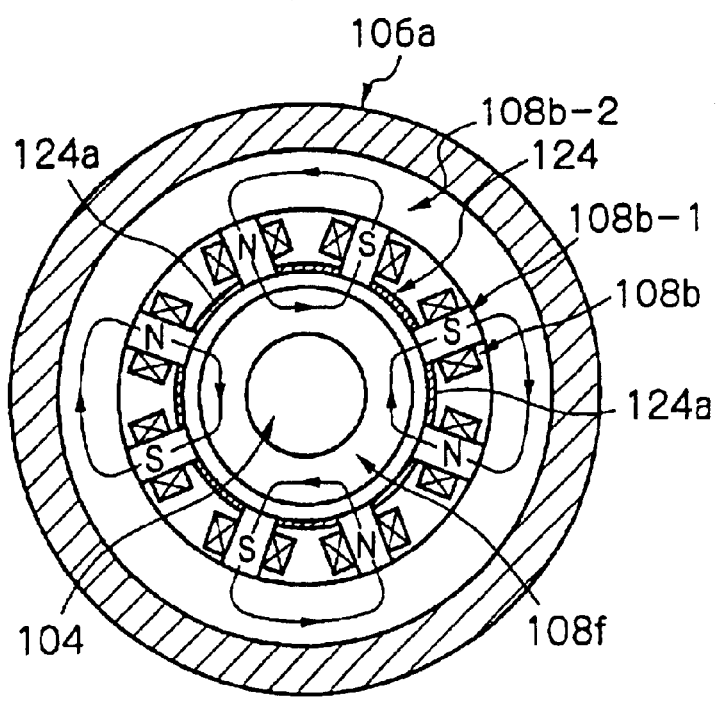
FIG. 9 is a diagram showing another example of an arrangement of a magnetic bearing, as viewed in cross-section taken along the line A—A in FIG. 6.

As shown in FIG. 9, the cores 108b of the electromagnets (stators) of the radial magnetic bearing 108 may comprise rodlike projecting cores 108b-1 and a base portion (connecting core) 108b-2 having a ring-shaped cross-section. Eight rodlike projecting cores 108b-1 are arranged at equal intervals in a substantially circumferential direction around the magnetic bearing rotor 108*f* so that one end of each projecting core 108*b*-1 faces the outer circumferential surface of the magnetic bearing rotor 108*f*. The projecting cores are connected to the non-magnetic body 124*a* to thereby form the separation wall 124 surrounding the magnetic bearing rotor 108*f*. Two adjacent projecting cores are taken as a pair, and the coil wires 108*d* are attached to the pair of projecting cores so that one projecting core forms an N-pole and the other projecting core forms an S-pole. The base portion 108*b*-2 magnetically connects the pair of adjacent projecting cores 108*b*-1.

By this arrangement of the electromagnets of the radial magnetic bearing 108, the rodlike projecting cores 108*b*-1 and the non-magnetic body 124*a* can be easily connected. That is, when the core 108*b* and the nonmagnetic body are connected by welding or soldering, there is a possibility of the coil wires 108*d* being damaged due to heat generated during a welding or soldering operation. This can be avoided in the above-mentioned arrangement, because the coil wires 108*d* are attached after the welding or soldering operation. This leads to easy manufacture and an increase in yield. Although the base portion 108*b*-2 has an integral body having a ring-shaped cross-section in this embodiment, it may be divided for each electromagnet.

Figure 10:
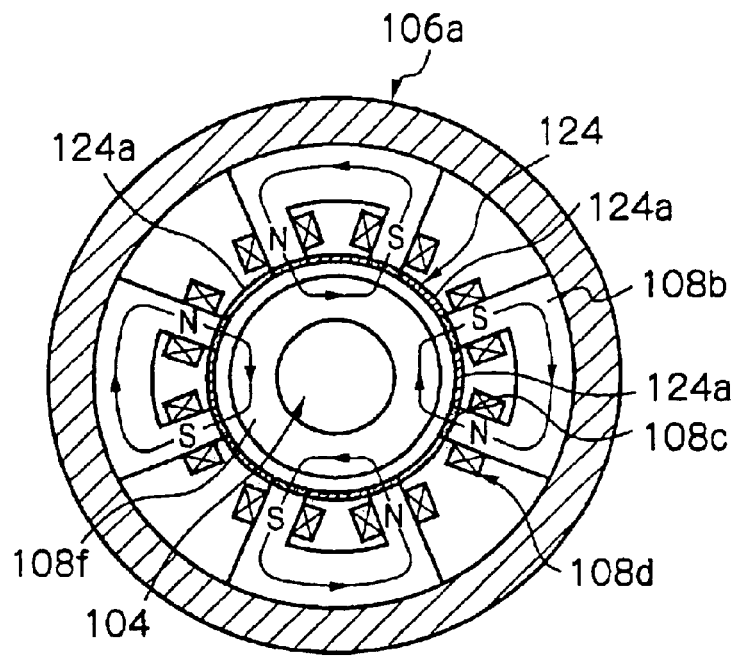
FIG. 10 is a diagram showing a further example of an arrangement of a magnetic bearing, as viewed in cross-section taken along the line A—A in FIG. 6.

As shown in FIG. 10, the electromagnets (stators) of the radial magnetic bearing 108 may comprise the U-shaped cores 108*b*, each having two projecting portions, wherein the projecting portions face the outer circumferential surface of the magnetic bearing rotor 108*f* and are arranged at substantially equal intervals in a circumferential direction around the rotor. The coil wires 108*d* are attached to the electromagnet so that one of the two projecting portions forms an N-pole and the other projecting portion forms an S-pole. An end face member (a sheet-like iron core member) 108*c* is provided on the surface of each projecting portion facing the magnetic bearing rotor 108*f*, and magnetic paths are formed in the cores 108*b*, the end face members 108*c* and the magnetic bearing rotor 108*f* as indicated by arrows in FIG. 10.

The end face members 108*c* are connected to the plate type non-magnetic body (isolating member) 124*a* and form the separation wall 124 surrounding the magnetic bearing rotor 108*f*. Thus, the magnetic bearing rotor 108*f* and the rotary shaft 104 are disposed within the sealed space communicated with the laser container 101, while the U-shaped cores 108*b* and the coil wires 108*d* are disposed outside the sealed space.

By this arrangement of the electromagnets of the radial magnetic bearing 108, the U-shaped cores 108*b* do not make contact with the laser gas. Therefore, any magnetic material can be used for the cores 108*b*. Therefore, the core 108*b* can be formed from a stack of silicon steel plates each having a thickness of 0.3 to 0.4 mm, resulting in high rigidity and high density of the magnetic bearing. Further, due to a stacked configuration of the core 108*b*, an electric resistance in the core 108*b* can be increased, so that an eddy current loss in the magnetic bearing can be extremely suppressed.

Figure 11:
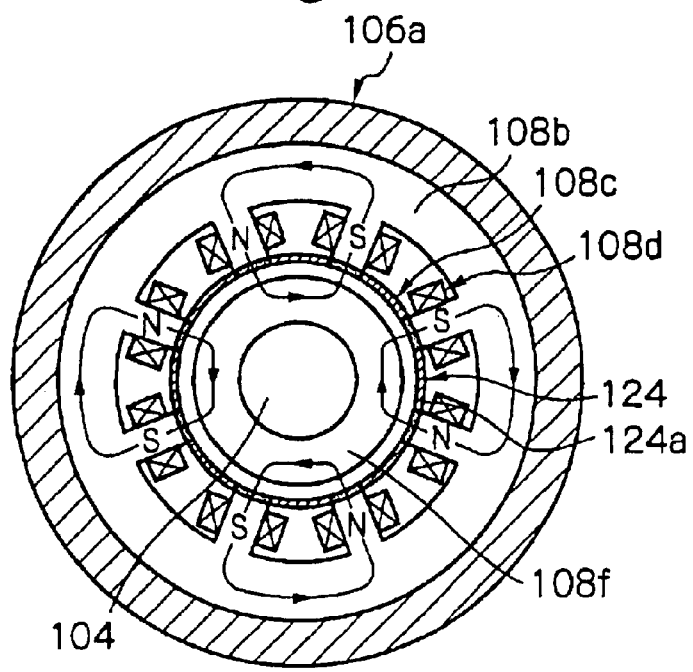
FIG. 11 is a diagram showing a further example of an arrangement of a magnetic bearing, as viewed in cross-section taken along the line A—A in FIG. 6.
Figure 12:
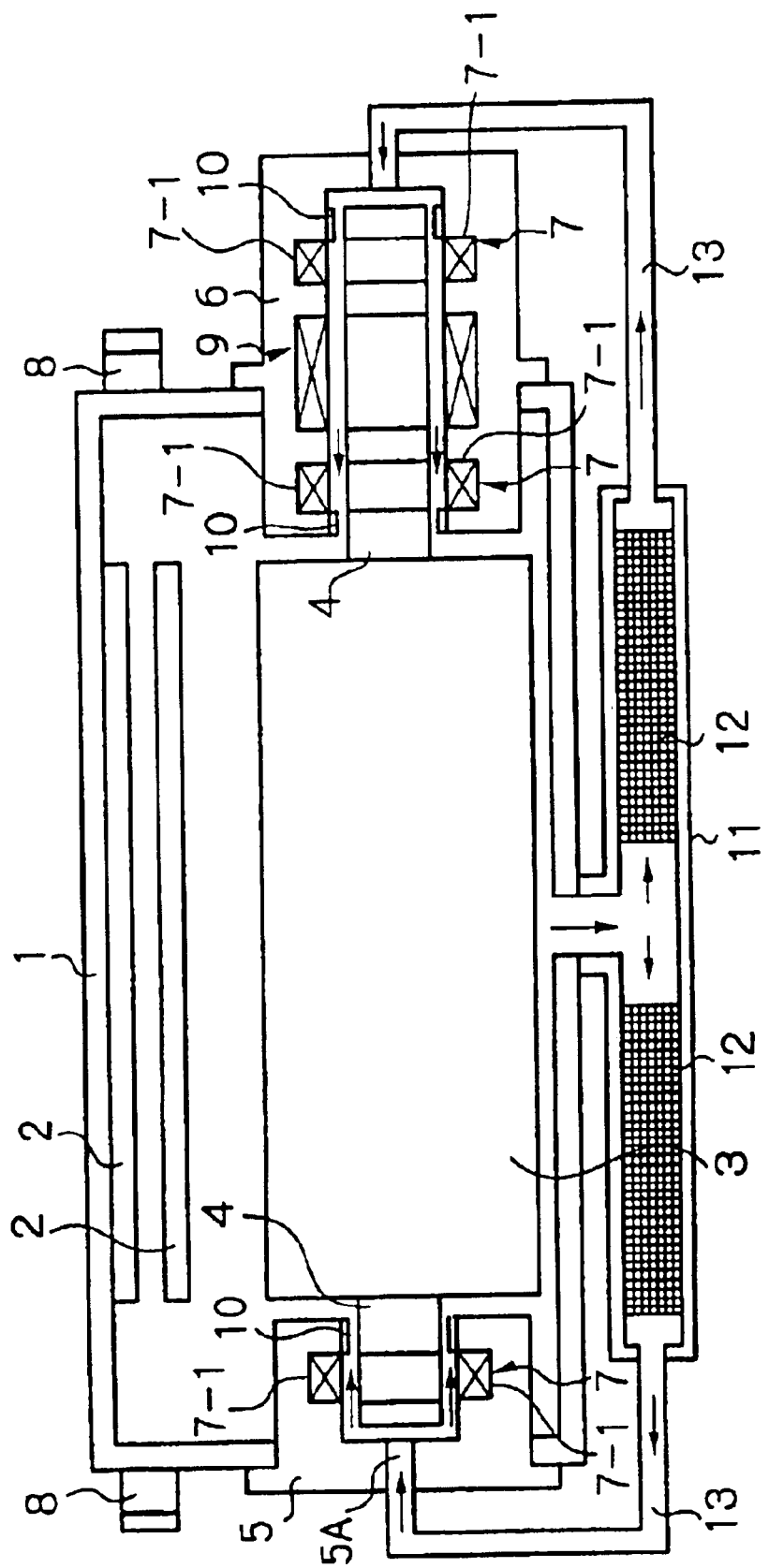
FIG. 12 is a cross-sectional view showing an arrangement of an excimer laser apparatus to which the present invention can be applied.
Figure 13:
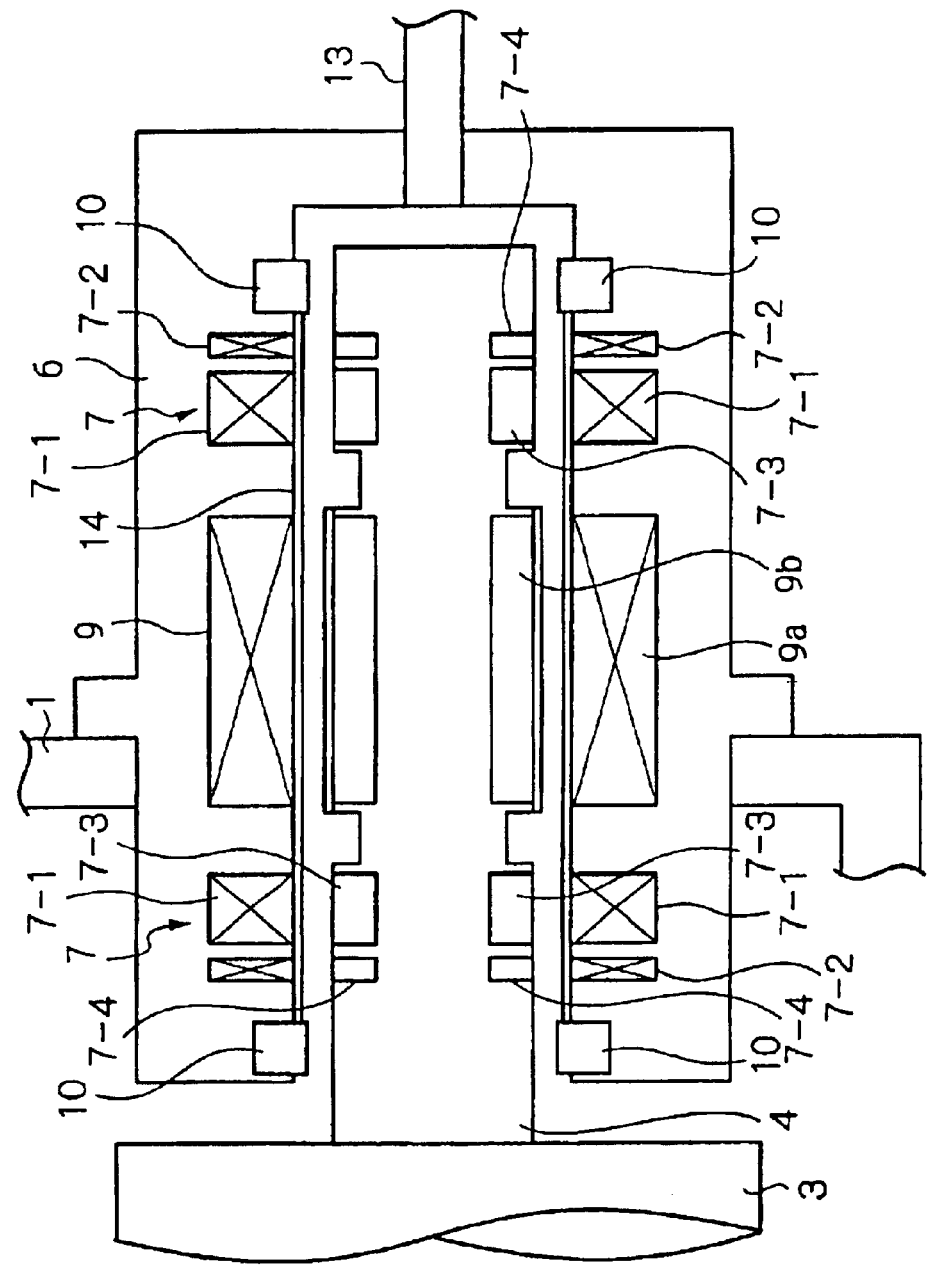
FIG. 13 is a diagram showing an arrangement of the inside of a motor housing of the excimer laser apparatus shown in FIG. 12.
Figure 15:
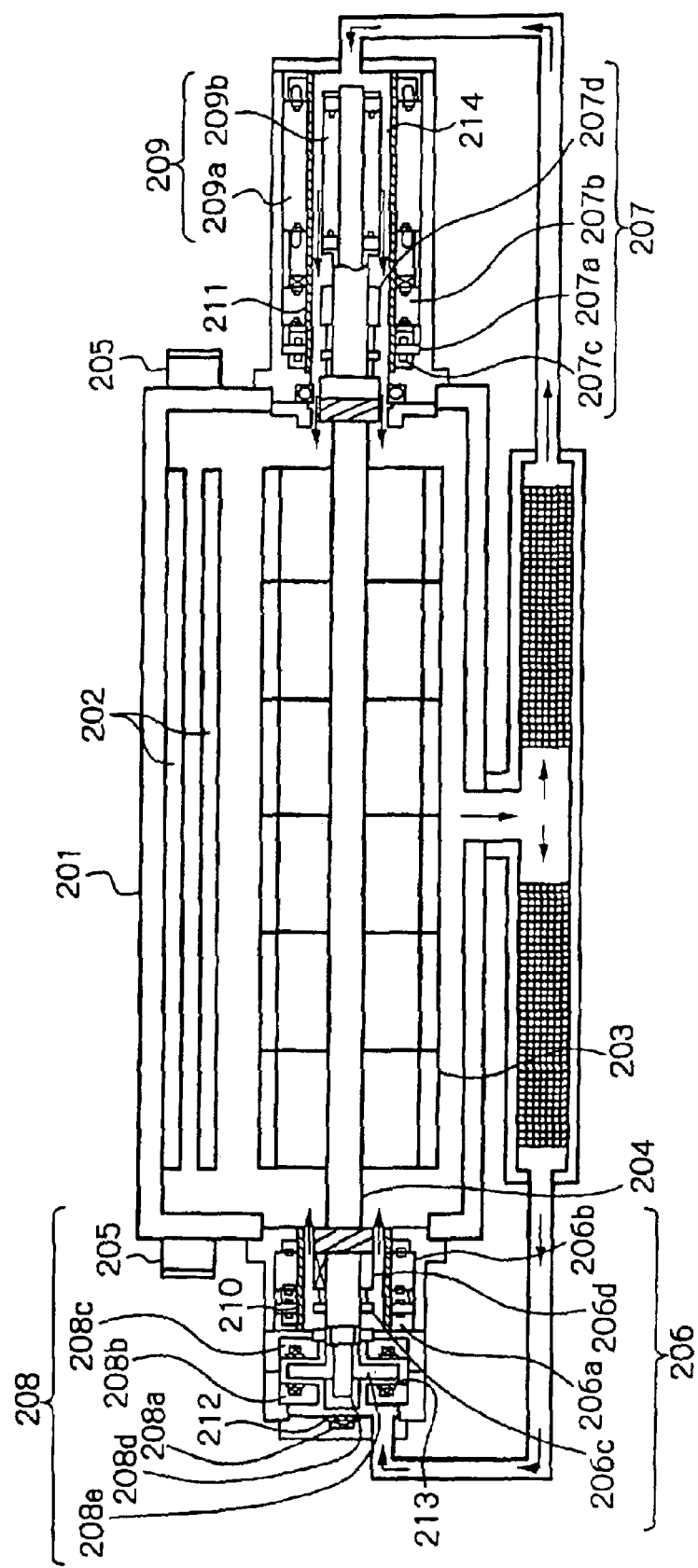
FIG. 15 is a cross-sectional view showing an arrangement of a conventional excimer laser apparatus to which the present invention can be applied.

As shown in FIG. 11, the cores 108*b* of the electromagnets of the radial magnetic bearing 108 may comprise a ring-shaped member having eight projecting portions extending inward so as to face the outer circumferential surface of the magnetic bearing rotor 108*f*. The projecting portions are arranged at equal intervals in a circumferential direction around the rotor. The coil wires 108*d* are attached so that two adjacent projecting portions form an N-pole and an S-pole. That is, four electromagnets are arranged at substantially equal intervals in a circumferential direction around the magnetic bearing rotor 108*f*.

In order to prevent formation of a magnetic short circuit between the electromagnets at the ring portion of the core, the coil wires 108*d* are attached in a manner such that two adjacent projecting portions of two adjacent electromagnets have the same polarity. The end face member 108*c* is provided in a manner such that it extends between and onto the surfaces of the two adjacent projecting portions having the same polarity. The end face members 108*c* are connected to the non-magnetic body (isolating member) 124*a*, thus forming the separation wall 124 having a sealable structure which surrounds the magnetic bearing rotor 108*f*.

By this arrangement of the electromagnets of the radial magnetic bearing 108, the electromagnets of the radial magnetic bearing 108 can be easily arranged at substantially equal intervals in a circumferential direction around the rotor. Therefore, magnetic forces generated by the electromagnets are readily exerted uniformly along the entire circumference of the rotor. Further, the number of the end face members 108*c* can be reduced by half as compared to the arrangement of FIG. 10. Therefore, the number of connecting portions between the non-magnetic body 124*a* and the end face members 108*c* is also reduced, resulting in easy manufacture of the separation wall 124 having a sealable structure.

The structure of the radial magnetic bearing 109 is the same as that shown in FIGS. 8 to 11, and therefore explanation thereof is omitted.

What is claimed is:

1. An excimer laser apparatus comprising:

a laser container in which a corrosive laser gas is sealably contained;

a circulation fan which generates a flow of laser gas between main discharge electrodes; and magnetic bearings which support a rotary shaft of the circulation fan, wherein:

each magnetic bearing comprises a magnetic bearing rotor provided on the rotary shaft and magnetic bearing stators provided around the magnetic bearing rotor; and each magnetic bearing stator comprises a stator core at least part of which is directly exposed toward the magnetic bearing rotor while the stator core is in contact with the corrosive laser gas, and coils that are attached to the stator core, and an isolating member for isolating each coil from the corrosive laser gas.

2. The excimer laser apparatus according to claim 1, wherein the isolating member is made of a corrosion-resistant material having corrosion resistance against the laser gas and each coil is embedded in the isolating member made of the corrosion-resistant material.

3. The excimer laser apparatus according to claim 2, wherein the corrosion-resistant material is a ceramic or glass type hardened material.

4. The excimer laser apparatus according to claim 1, wherein the isolating member comprises a coil case for sealingly enclosing each coil.

5. The excimer laser apparatus according to claim 1, wherein the isolating member comprises a sheath covering each electrically conductive wire of which the coil is made.

6. The excimer laser apparatus according to claim 1, wherein the stator core comprises a magnetic body which has corrosion resistance against the corrosive laser gas or a magnetic body which has been subjected to an anticorrosion treatment against the corrosive laser gas.

7. The excimer laser apparatus according to claim 1, wherein:

each magnetic bearing is a radial magnetic bearing;

the stator core has projecting portions facing the magnetic bearing rotor;

the coils are attached to the projecting portions; and at least part of each projecting portion extends through a separation wall and is exposed toward the magnetic bearing rotor, the separation wall comprising the isolating member.

8. The excimer laser apparatus according to claim 7, wherein the magnetic bearing stators comprise a plurality of rodlike projecting portions and a base portion to which the projecting portions are connected, the base portion having a ring-shaped cross-section.

9. The excimer laser apparatus according to claim 1, wherein:

each magnetic bearing is a radial magnetic bearing; and the stator core has projecting portions facing the magnetic bearing rotor, the coils being attached to the projecting portions, and an end face member attached to a surface of each projecting portion facing the magnetic bearing rotor, the end face member comprising a magnetic body having corrosion resistance against the corrosive laser gas, the end face member being exposed toward the magnetic bearing rotor.

10. The excimer laser apparatus according to claim 9, wherein:

a plurality of U-shaped cores, each having two projecting portions formed therein, are provided as the stator cores;

the coils are attached to each U-shaped core so that the two projecting portions form an N-pole and an S-pole;

the plurality of U-shaped cores are provided around the magnetic bearing rotor so that each projecting portion faces the magnetic bearing rotor and that two adjacent projecting portions of two adjacent U-shaped cores have the same polarity; the end face member is provided so as to extend between and onto the projecting portions having the same polarity; and the isolating member is provided so as to extend between the projecting portions having different polarities, the isolating member comprising a non-magnetic body.

11. An excimer laser apparatus comprising:

a laser container in which a corrosive laser gas is sealably contained;

a circulation fan which generates a flow of laser gas between main discharge electrodes; and magnetic bearings which support a rotary shaft of the circulation fan, wherein each magnetic bearing comprises a magnetic bearing rotor provided on the rotary shaft and magnetic bearing stators provided around the magnetic bearing rotor; and each magnetic bearing stator comprises a stator core at least part of which is exposed toward the magnetic bearing rotor while the stator core is in contact with the corrosive laser gas, and a plurality of coils attached to the stator core, and an isolating member for isolating each coil from the corrosive laser gas, wherein each magnetic bearing is a radial magnetic bearing; and the stator core has projecting portions facing the magnetic bearing rotor, the coils being attached to the projecting portions, and an end face member attached to a surface of each projecting portion facing the magnetic bearing rotor, the end face member comprising a magnetic body having corrosion resistance against the corrosive laser gas, the end face member being exposed toward the magnetic bearing rotor, wherein:

the stator cores comprise a ring-shaped base portion provided around the magnetic bearing rotor and projecting portions extending radially inward from an inner circumferential surface of the base portion, the projecting portions being arranged at substantially equal intervals in a circumferential direction of the base portion;

the coils are attached to the projecting portions so that an order of arrangement of the projecting portions is such that the N-pole, the S-pole, the S-pole and the N-pole are repeated as a unit;

the end face member is provided so as to extend between and onto the projecting portions having the same polarity; and the isolating member is provided so as to extend between the projecting portions having different polarities, the isolating member comprising a non-magnetic body.

* * * * *